United States Patent
Robertson, Jr.

(10) Patent No.: US 7,254,423 B2
(45) Date of Patent: Aug. 7, 2007

(54) LATCHING MECHANISM AND METHOD OF OPERATION THEREOF

(75) Inventor: William H. Robertson, Jr., Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 279 days.

(21) Appl. No.: 10/741,653

(22) Filed: Dec. 19, 2003

(65) Prior Publication Data

US 2005/0136995 A1   Jun. 23, 2005

(51) Int. Cl.
*H04M 1/00* (2006.01)
(52) U.S. Cl. .................. 455/575.1; 455/347; 455/348; 455/575.8
(58) Field of Classification Search ............. 455/550.1, 455/425, 557.1, 557.8, 347, 348, 575.1, 575.8
See application file for complete search history.

(56) References Cited

U.S. PATENT DOCUMENTS

| | | | |
|---|---|---|---|
| 5,469,505 A * | 11/1995 | Gattey et al. ............... | 379/430 |
| 6,305,588 B1 * | 10/2001 | Michel et al. ............... | 224/271 |
| 2001/0049292 A1 * | 12/2001 | Strawn et al. .............. | 455/550 |
| 2003/0083018 A1 * | 5/2003 | Sadler et al. ................. | 455/90 |
| 2003/0086562 A1 * | 5/2003 | Wong et al. ........... | 379/420.01 |
| 2004/0125977 A1 * | 7/2004 | Hong et al. .................. | 381/376 |
| 2004/0203484 A1 * | 10/2004 | Charlier et al. ............. | 455/90.1 |
| 2004/0203501 A1 * | 10/2004 | Johnson et al. ............. | 455/90.3 |
| 2004/0264688 A1 * | 12/2004 | Hampton et al. ...... | 379/433.02 |
| 2005/0014537 A1 * | 1/2005 | Gammon et al. ......... | 455/575.1 |
| 2005/0040192 A1 * | 2/2005 | Steven et al. ................ | 224/197 |
| 2005/0141743 A1 * | 6/2005 | Seto ........................... | 381/371 |

* cited by examiner

*Primary Examiner*—Duc M. Nguyen
*Assistant Examiner*—Dai Phuong
(74) *Attorney, Agent, or Firm*—Larry G. Brown

(57) ABSTRACT

The invention concerns a latching mechanism (105) for assembly of a housing (110) of an electronic device (100). The latching mechanism includes a latch element (120) and a receiving element (131) contained within the housing. The receiving element includes a recess (140) for engaging the latch element and at least one audio port (122) for providing an audio channel (190) for the electronic device. The invention also concerns a method (500) of operating a latching mechanism. The method includes the steps of mechanically coupling (512) a latch element to a housing, creating (514) an audio channel by engaging the latch element within the housing and porting (516) audio through the audio channel.

17 Claims, 5 Drawing Sheets

LATCHING MECHANISM AND METHOD OF OPERATION THEREOF

BACKGROUND OF THE INVENTION

1. Field of the Invention

This invention relates in general to latching mechanisms and more particularly to latching mechanisms for use in devices that generate audio.

2. Description of the Related Art

Many electronic devices include one or more latches for coupling together several mechanical components. Latches also facilitate disassembly of the coupled components permitting replacement and/or access to other components contained within. For example, latches can be used to secure a front housing of a device to a back housing of the device. Using latches is desirable because it eliminates the need for screws and screw bosses, thereby lowering manufacturing costs and providing for an increased useable circuit board area. Incorporating latches into an electronic device, however, does require reservation of some space in the device to enable their operation.

Most electronic devices also include one or more speakers for broadcasting audio. With the drive towards reducing the size of electronic devices, particularly portable or mobile units, advances have been made to reduce the size of speakers. Nevertheless, speakers and the structure required to support them take up valuable space in these devices. Additionally, speakers and their supporting structure are constructed and assembled independently of all other components of electronic devices.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
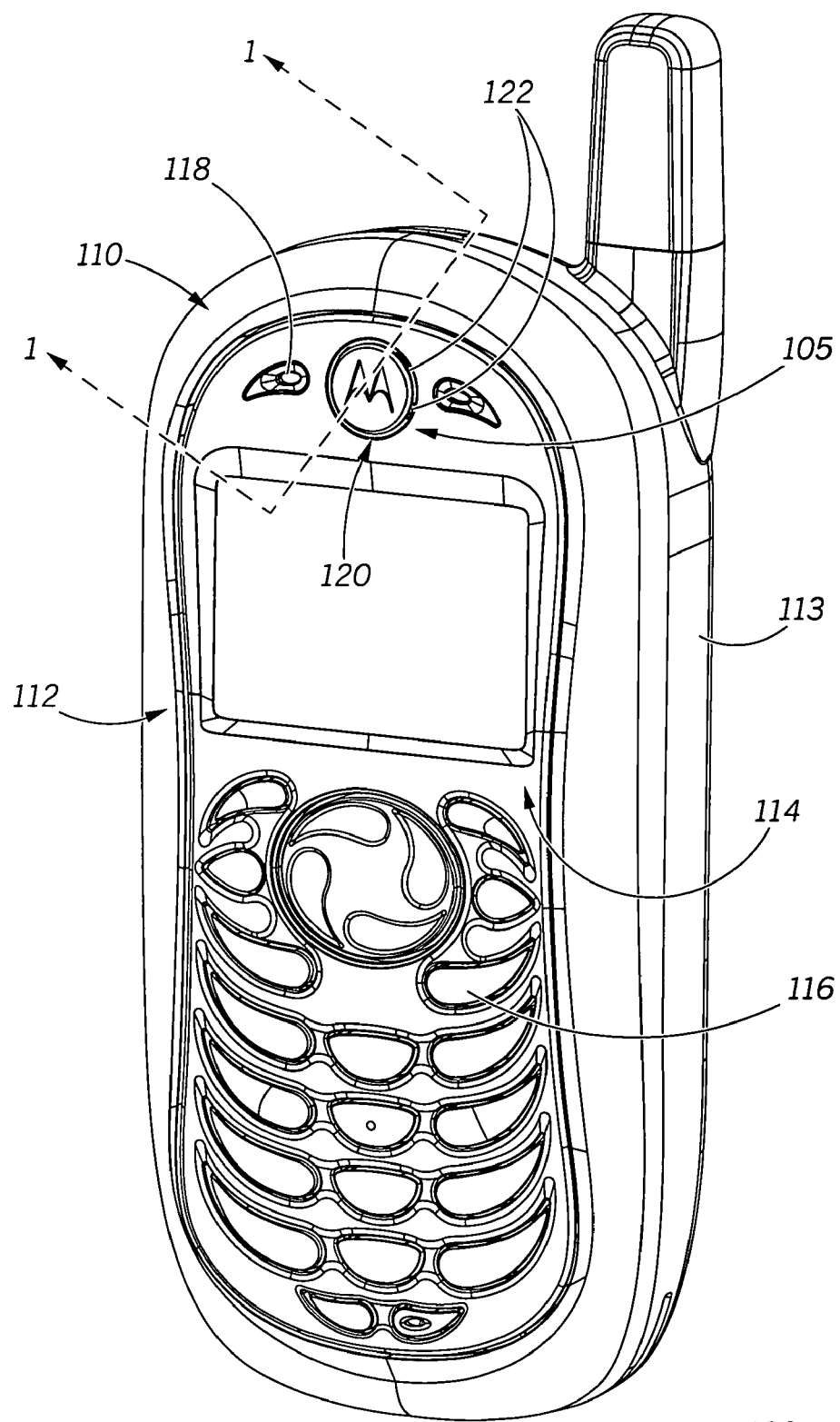
FIG. 1 illustrates a perspective view of an example of an electronic device.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, an example of an electronic device 100 is shown. As illustrated, the electronic device 100, by way of example only, can be embodied in a cellular radiotelephone having a conventional cellular radio transceiver circuitry, as is known in the art, and will not be presented here for simplicity. The invention is alternatively applied to other electronic devices such as, for example, messaging devices, personal digital assistants, personal computers, mobile radio handsets, cordless radiotelephone and the like. In one arrangement, the electronic device 100 can include a latching mechanism 105, a housing 110, a keypad 116, a leakage port 118, a latch element 120 and one or more audio ports 122. In addition, the housing 110 can include a front housing 112, a back housing 113, both of which can be referred to as a fixed housing portion. The housing 110 can also include a removable housing portion 114. The latch element 120 can cause one or more of the components of the electronic device 100 to engage or disengage one another. In one particular arrangement, sound can propagate through the audio ports 122 without any interference from the latch element 120. As such, the latch element 120 can serve as a securing mechanism and can facilitate the channeling of audio through the electronic device 100.

Figure 2:
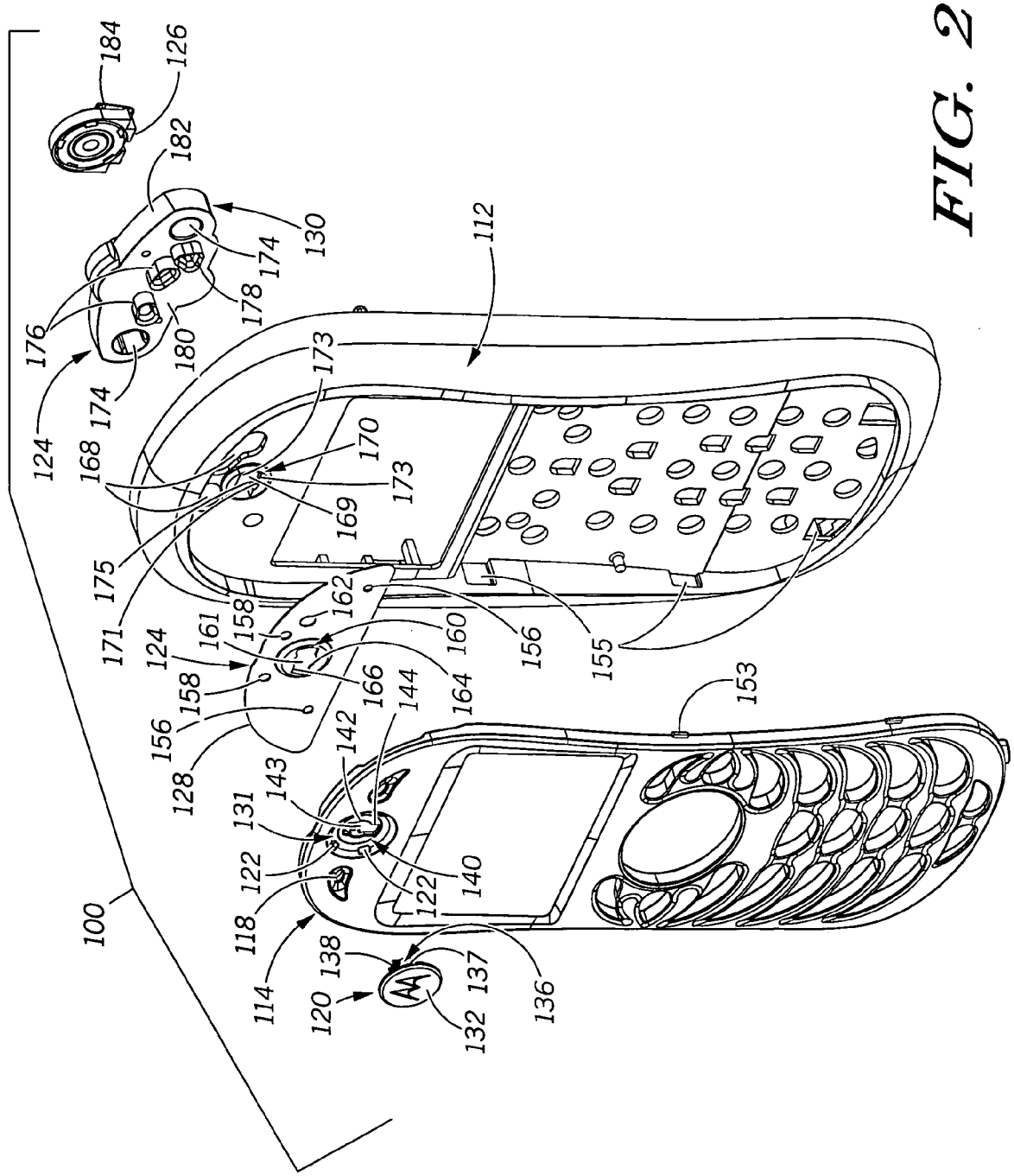
FIG. 2 illustrates a front exploded view of the electronic device of FIG. 1.
Figure 3:
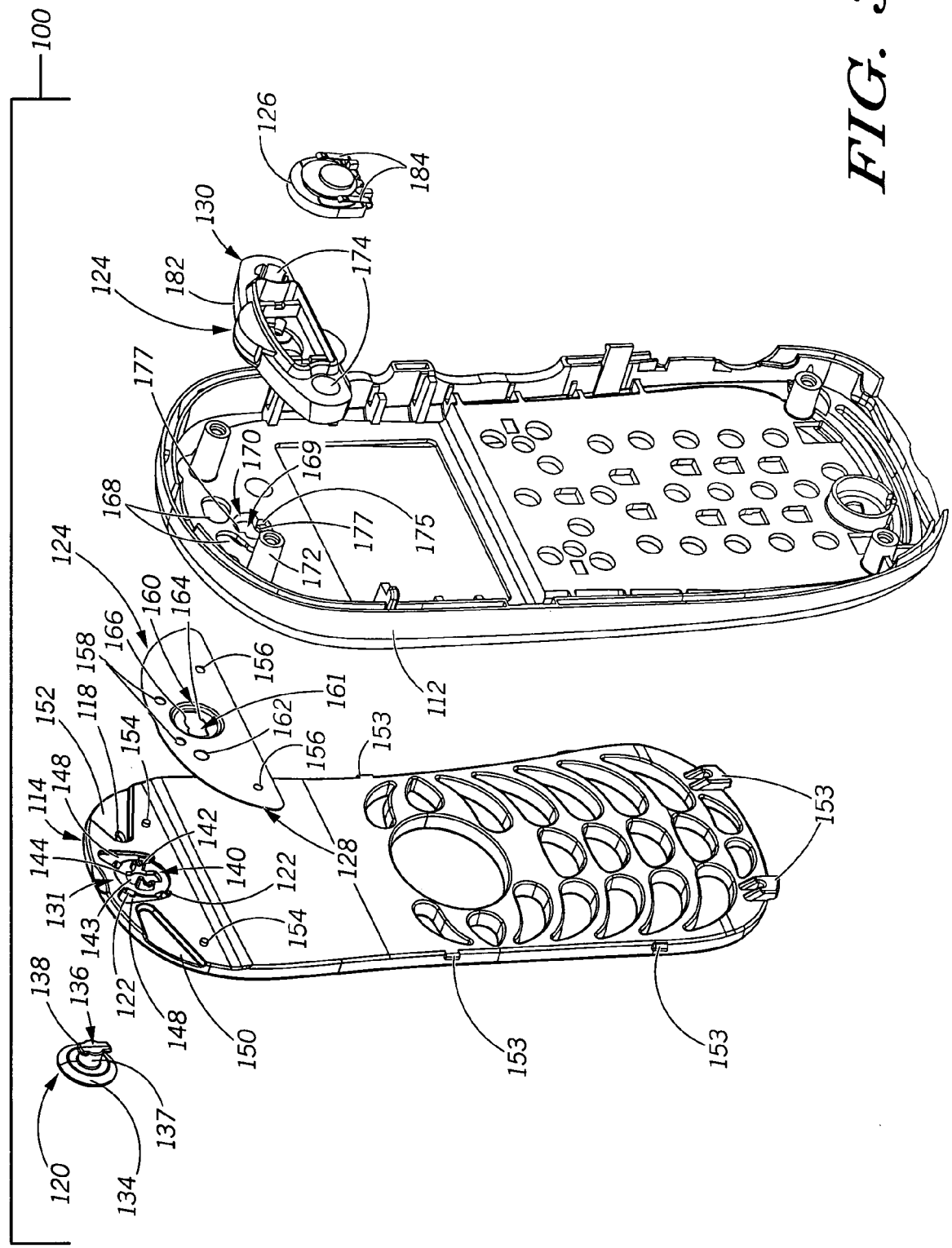
FIG. 3 illustrates a rear exploded view of the electronic device of FIG. 1.

Referring to FIGS. 2 and 3, exploded views of the electronic device 100 are shown. Specifically, FIG. 2 shows a front exploded view of the electronic device 100, and FIG. 3 shows a rear exploded view of the electronic device 100. Front and rear views of the latch element 120, the removable housing portion 114, the front housing 112 and the leakage port 118 are shown. In this example, the electronic device 100 can also include a secondary latch element 124 and an audio element 126, of which front and rear views are respectively illustrated in FIGS. 2 and 3. In one embodiment, the secondary latch element 124 can include an audio plate 128 and a seal 130. The electronic device 100 can also include a receiving element 131, which can be part of the removable housing portion 114, although it will be appreciated by those of ordinary skill in the art that the receiving element 131 can be incorporated into any other suitable component of the electronic device 100. All or portions of the housing 110, the latch element 120, the audio ports 122, the secondary latch element 124 and the audio element 126 can be considered part of the latching mechanism 105.

The latch element 120 can include a top surface 132 (see FIG. 2), a bottom surface 134 (see FIG. 3) and a protrusion 136, which can extend away from the bottom surface 134. The protrusion 136 can have a shaft 137 and can also include one or more wings 138 that can extend away from the shaft 137 in any suitable direction. In addition, the receiving element 131 can include a recess 140 for engaging the latch element 120. The recess 140 can include an opening 143 that can have a shape that is at least substantially similar to the shape of at least a portion of the latch element 120. For example, the opening 143 can include one or more arcs 142 and one or more segments 144 that respectively correspond to the shaft 137 and the wings 138 of the protrusion 136. The opening 143 can also have an orientation that is at least substantially vertical with respect to the electronic device 100, although the opening 143 may incorporate any other suitable orientation.

In another arrangement, the receiving element 131 can include one or more of the audio ports 122 and one or more cavities 148 (see FIG. 3). The audio ports 122 and the cavities 148 can form part of an audio channel, as will be explained below. Moreover, the removable housing portion 114 can include a back port cavity 150 (see FIG. 3), a leakage cavity 152 (see FIG. 3) and one or more stems 154 (see FIG. 3), which can be fed through corresponding apertures 156 of the audio plate 128 when the audio plate 128 is positioned against the removable housing portion 114. The leakage cavity 152 can be open to the outside environment when the electronic device 100 is fully assembled and, in conjunction with the leakage port 118, can be used to prevent a seal from forming between the electronic device 100 and a user's ear.

The removable housing portion 114 can also include any number of tabs 153, each of which can be positioned along the edges of the removable housing portion 114. These tabs 153 can be designed to snap engage one or more corresponding slots 155 located on the front housing 112 (see FIG. 2). This structure can permit a user to remove and replace freely the removable housing portion 114 of the electronic device 100. Although not pictured in FIGS. 2 and 3, the keypad 116 can be inserted between the removable housing portion 114 and the front housing 112 during the initial assembly of the electronic device 100 or when the removable housing portion 114 is being replaced.

The audio plate 128 can include one or more audio plate audio ports 158, an audio plate recess 160 having an audio plate opening 161 for receiving the protrusion 136 of the latch element 120 and an audio plate back port 162. The audio plate audio ports 158 can facilitate the channeling of audio to or from the cavities 148 of the receiving element 131. Further, the audio plate back port 162 can facilitate the channeling of back volume to the back port cavity 150. Similar to the opening 143 of the recess 140, the audio plate opening 161 can include an arc 164 and one or more segments 166 for respectively receiving the shaft 137 and the wings 138 of the protrusion 136. As a result, the audio plate opening 161 can have a shape that is also at least substantially similar to at least a portion of the protrusion 136. In one example, the latch element 120 and the removable housing portion 114 can be constructed of plastic, and the audio plate 128 can be constructed of metal, although those of ordinary skill in the art will appreciate that other suitable materials may be used to produce these components.

In one arrangement, the orientation of the audio plate opening 161 can be approximately ninety degrees different from the orientation of the opening 143 of the removable housing portion 114. For example, the orientation of the audio plate opening 161 can be at least substantially horizontal. It will be appreciated by those of ordinary skill in the art that other suitable orientations are within contemplation of the inventive arrangements.

The front housing 112, which can be constructed of any suitable material, such as plastic, can include one or more front housing audio ports 168 and a front housing recess 170. As best shown in FIG. 3, the front housing 112 can also have one or more projections 172, which can be inserted through corresponding apertures 174 of the seal 130 (see FIGS. 2 and 3). The front housing recess 170 can have a front housing opening 169 that can receive the protrusion 136 of the latch element 120 and can have an orientation similar to the audio plate opening 161. Additionally, the front housing opening 169 can have one or more arcs 171 and one or more segments 173 (best shown in FIG. 2), which can respectively receive the shaft 137 and wings 138 of the protrusion 136 of the latch element 120. Accordingly, the front housing opening 169 can be shaped at least substantially similar to at least a portion of the protrusion 136 of the latch element 120.

The front housing recess 170 can further include one or more stops 175 and a blocking surface 177 (see FIG. 3). The stops 175 can engage the wings 138 of the protrusion 136 when the protrusion 136 is rotated, which can prevent the latch element 120 from spinning in a complete circle when the electronic device 100 is assembled. Moreover, the blocking surface 177 can also engage the wings 138 when the protrusion 136 is rotated, which will prevent the latch element 120 from moving in an axial direction when the electronic device 100 is assembled.

As illustrated in FIG. 2, the seal 130 can include one or more seal audio ports 176 and a seal back port 178. In one arrangement, the seal audio ports 176 and the seal back port 178 can extend through the front housing audio ports 168 of the front housing 112 when the electronic device 100 is assembled. One of the front housing audio ports 168 can be designed to receive both a seal audio port 176 and a seal back port 178, although the invention is not limited to this particular configuration.

The seal 130 can also include a seal plate 180 (see FIG. 2) and a skirt 182. In one embodiment, the seal plate 180 can be made of metal, and the skirt 182 can be constructed of a flexible material such as rubber, which can be useful for sealing the seal 130 against, for example, a circuit board (not shown). The seal audio ports 176 and the seal back port 178 can also be made of rubber. It will be appreciated by those of ordinary skill in the art that other suitable materials can be used to construct any of the above-mentioned elements.

The seal 130 can house the audio element 126. The audio element 126 can be any component capable of generating an audio output or receiving an audio input. For example, the audio element 126 can be a speaker or a microphone. The audio element 126 can also include one or more contacts 184, which can be used to provide a contact surface for a circuit board or some other device used to convey signals to the audio element 126.

During the initial assembly of the electronic device 100, the latch element 120 can be rotatably coupled to the recess 140 of the removable housing portion 114. Specifically, the protrusion 136 can be inserted through the opening 143 such that the wings 138 of the protrusion 136 are oriented in substantially the same direction as the segments 144 of the opening 143. Once inserted, the latch element 120 can be rotated such that the wings 138 of the protrusion 136 are oriented in a direction that is different from the orientation of the segments 144. For example, the latch element 120 can be rotated approximately ninety degrees in either a clockwise (CW) or a counter-clockwise (CCW) direction.

Following the rotation, the wings 138 of the protrusion 136 can now be at least substantially aligned with the segments 166 of the audio plate opening 161. The audio plate 128 can then be secured to the removable housing portion 114 with an adhesive, although any other process or structure can be employed to do so. Once the audio plate 128 is secured to the removable housing portion 114, the latch element 120, because the opening 143 and the audio plate opening 161 have different orientations, can remain coupled to the recess 140 and can be rotated in a CW or CCW direction.

Continuing with the initial assembly, the projections 172 of the front housing 112 can be inserted through the apertures 174 of the seal 130, and the seal 130 can be positioned against the front housing 112. The seal audio ports 176 and the seal back port 178 can extend beyond the front housing audio ports 168. In view of this feature, the seal audio ports 176 and the seal back port 178 may contact the audio plate 128 when the electronic device 100 is fully assembled, a process that will be further explained below. The seal 130, which can house the audio element 126, can be secured to the front housing 112 with an adhesive; however, one of ordinary skill in the art will appreciate that any other suitable process or structure can be used to secure these two components.

Figure 4:
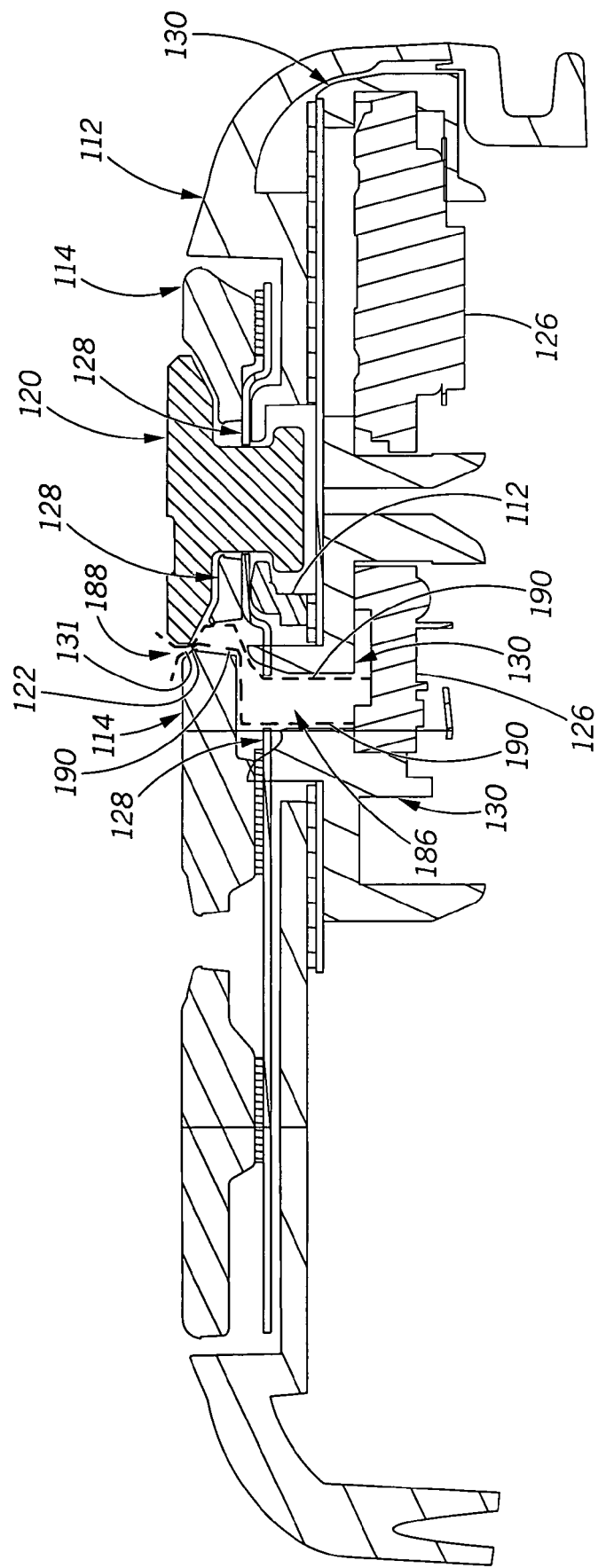
FIG. 4 illustrates a cross-sectional view of the electronic device looking along reference lines 1-1 of FIG. 1.
Figure 5:
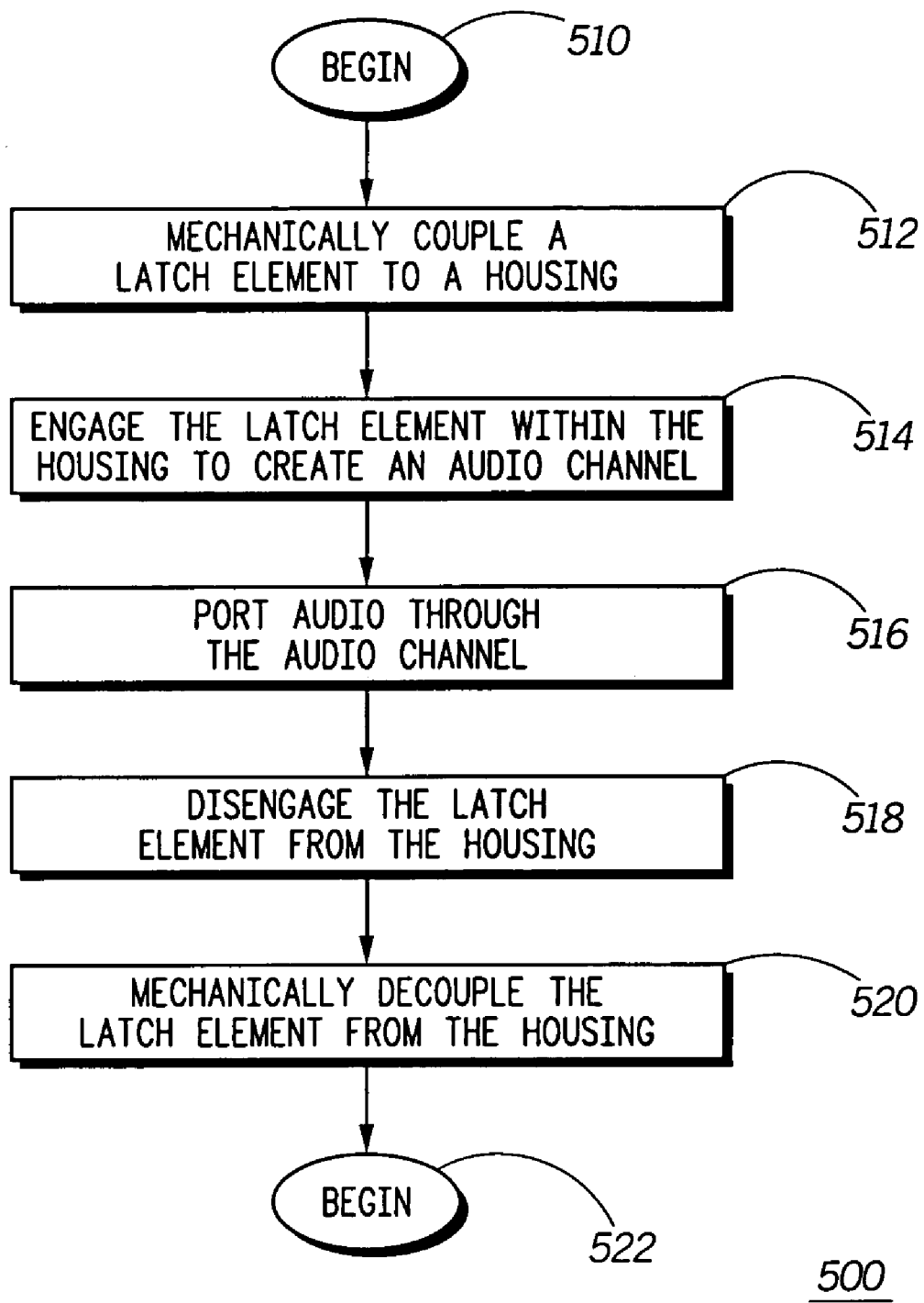
FIG. 5 illustrates a method of operating a latch mechanism of the electronic device of FIG. 1.

Referring to FIG. 4, a cross-sectional view of the electronic device 100 when it is assembled, looking along reference lines 1-1 of FIG. 1, is shown (the back housing 113 is not shown in FIG. 4). Cross-sectional views of the front housing 112, the removable housing portion 114, the latch element 120, the audio element 126, the audio plate 128 and the seal 130 are illustrated in FIG. 4. Referring to FIG. 5, a method 500 of operating a latch mechanism is shown. In describing the method 500, reference will be made to the components illustrated in FIGS. 1-4, although it will be appreciated by those of ordinary skill in the art that the method 500 can be practiced with any other suitable device or in any other suitable system.

At step 510, the method can begin, and at step 512, a latch element can be mechanically coupled to a housing. For example, the latch element 120 can be coupled to the housing 110 of the electronic device 100. A series of steps may be involved in this process, and each of them will be discussed herein. The latch element 120 can be rotated to a first orientation in which the protrusion 136 is aligned with the audio plate opening 161 and misaligned with the opening 143 of the recess 140. That is, the wings 138 of the protrusion 136 can be aligned with the segments 166 of the audio plate 128 and misaligned with the segments 144 of the opening 143. The protrusion 136 can also be aligned with the front housing opening 169, i.e., the wings 138 can be aligned with the segments 173 of the front housing opening 169. The removable housing portion 114 can then be engaged with the front housing 112 (by engaging the tabs 153 with the slots 155), and the protrusion 136 can be inserted through the front housing opening 169. During this process of engaging the latch element 120 with the housing 110, the keypad 116 (see FIG. 1) can be positioned against the removable housing portion 114 so that it can be assembled between the removable housing portion 114 and the front housing 112.

Referring back to the method 500 of FIG. 5, next, at step 514, the latch element can be engaged within the housing to create an audio channel. For example, the latch element 120 can be engaged within the housing 110 to create an audio channel, which will be described below. Referring to FIGS. 1-4, to engage the latch element 120 within the housing 110, the latch element 120 can be rotated to a second orientation such that the protrusion 136 is aligned with the opening 143 of the recess 140 and misaligned with the audio plate opening 161 and the front housing opening 169. In this arrangement, the wings 138 of the protrusion 136 can be aligned with the segments 144 of the opening 143 and misaligned with the segments 166 of the audio plate opening 161 and the segments 173 of the front housing opening 169.

As the latch element 120 is rotated to the second orientation, the wings 138 of the protrusion 136 can engage the blocking surfaces 177 (see FIG. 3) and eventually the stops 175. The stops 175 can stop the rotation of the latch element 120, and the blocking surfaces 177 can prevent the latch element 120 from moving in an axial direction, such as away from the electronic device 100. The seal 130, because it is positioned against the front housing 112, can also limit the axial movement of the latch element 120.

At this point, at least a portion of the housing 110 can be mechanically coupled between the latch element 120 and at least a portion of the secondary latch element 124. For example, the front housing 112 can be coupled between the latch element 120 and the seal 130. At least a portion of the secondary latch element 124 can also be mechanically coupled between the audio element 126 and at least a portion of the housing 110. For example, the seal 130 of the secondary latch element 124 can be coupled between the audio element 126 and the front housing 112. The audio plate 128 can be mechanically coupled between the latch element 120 and at least a portion of the housing 110, such as the front housing 112.

When the electronic device 100 is assembled, including when the latch element 120 is engaged within the housing 110, several audio passages can be formed. In particular, the seal audio ports 176 and the seal back port 178 can be at least substantially aligned with the audio plate audio ports 158 and the audio plate back port 162. Because they can extend beyond the front housing audio ports 168, the seal audio ports 176 and the seal back port 178 can be at least partially in contact with the audio plate 128. Thus, the seal audio ports 176 and the audio plate audio ports 158 can form a secondary latch element audio port 186, as best shown in FIG. 4. The secondary latch element audio port 186 can be aligned with the audio ports 122. Additionally, a gap 188 can be formed between the latch element 120 and the receiving element 131. The secondary latch element audio port 186, the gap 188 and the audio ports 122 can be part of an audio channel 190, which is represented by the broken lines shown in FIG. 4. The cavities 148 (see FIG. 3) can also be considered part of the audio channel 190.

Referring back to the method 500 of FIG. 5, next, at step 516, audio can be ported through the audio channel. For example, referring back to FIG. 4, audio can be directed from the audio element 126 and transmitted through the audio channel 190 to the outside environment, if the audio element 126 outputs audio. If the audio element 126 receives audio, the audio element 126 can receive an audio input through the audio channel 190 from the outside environment.

Next, at step 518 of the method 500 of FIG. 5, the latch element can be disengaged from the housing. For example, referring once again to FIGS. 1-4, the latch element 120 can be disengaged from the housing 110. In one arrangement, the latch element 120 can be rotated back to its first orientation in which the protrusion 136 is aligned with the front housing opening 169 and the audio plate opening 161 and is misaligned with the opening 143 of the recess 140. During this process, the wings 138 of the protrusion 136 can disengage from the stops 175 and the blocking surfaces 177 of the front housing opening 169.

Referring back to the method 500 of FIG. 5, next, at step 520, the latch element can be mechanically decoupled from at least a portion of the housing, and the method 500 can end at step 522. For example, referring back to FIGS. 2 and 3, the latch element 120 and the removable housing portion 114 to which it is rotatably coupled can be removed or disassembled from the front housing 112 by disengaging the tabs 153 of the removable housing portion 114 from the slots 155 (see FIG. 2) of the front housing 112. Once removed, the removable housing portion 114 and the latch element 120 can be reengaged with the housing 110 in accordance with the above discussion. Alternatively, a different removable housing portion 114 and latch element 120 can be engaged with the housing 110 in accordance with the above discussion.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electronic device, comprising:
   a housing, comprising:
      a fixed housing portion;
      a removable housing portion having a recess and at least one audio port, wherein the audio port is part of the recess;
      a latching mechanism for assembling the removable housing portion to the fixed housing portion, wherein the latch mechanism comprises:
         a latch element rotatably coupled to the removable housing portion, wherein the latch element rotation includes an orientation for engaging the latch element to assemble the removable housing portion to the fixed housing portion; and
      an audio channel, wherein the audio port is part of the audio channel and the audio channel is formed when the removable housing portion is assembled to the fixed housing portion.

2. The electronic device as defined in claim 1, wherein the latch element rotation further includes another orientation for disengaging the latch element to disassemble the removable housing portion from the fixed housing portion.

3. The electronic device as defined in claim 2, wherein the latch element comprises a protrusion, wherein the recess further comprises a similarly-shaped opening, and further wherein the protrusion aligns with the similarly-shaped opening in the orientation for engaging the latch element to assemble the removable housing portion to the fixed housing portion.

4. The electronic device as defined in claim 3, wherein the protrusion misaligns with the similarly-shaped opening in the orientation for disengaging the latch element to disassemble the removable housing portion from the fixed housing portion.

5. The electronic device as defined in claim 1, wherein a gap is formed between the latch element and the recess when the removable housing portion is assembled to the fixed housing portion, and further wherein the audio channel comprises the gap.

6. The electronic device of claim 1, wherein the latching mechanism further comprises:
   a secondary latch element, wherein the housing is mechanically coupled between the latch element and at least a portion of the secondary latch element, wherein the secondary latch element comprises at least one secondary latch element audio port aligned with the at least one audio port, and further wherein the audio channel further comprises the at least one secondary latch element audio port.

7. The electronic device as defined in claim 6, further comprising an audio element, wherein at least a portion of the secondary latch element is mechanically coupled between the audio element and the fixed housing portion.

8. The electronic device as defined in claim 1, a keypad, wherein the keypad is assembled between the fixed housing portion and the removable housing portion.

9. A method of operating a latching mechanism, comprising the steps of:
   mechanically coupling a latch element to a housing, wherein the recess includes at least one audio port, wherein the housing includes a fixed housing portion and a removable housing portion and the recess is part of the removable housing portion;
   creating an audio channel by engaging the latch element within the housing such that the removable housing portion is assembled to the fixed housing portion, wherein the audio ports are part of the audio channel; and
   porting audio through the audio ports of the audio channel.

10. The method of operating a latching mechanism as defined in claim 9, wherein the mechanically coupling step includes forming a gap between the latch element and the housing, and further wherein the audio channel created in the creating step comprises the gap.

11. The method of operating a latching mechanism as defined in claim 9, wherein engaging of the latch element within the housing comprises rotating the latch element to an orientation.

12. The method of operating a latching mechanism as defined in claim 11, further comprising the step of:
   assembling a keypad between the fixed housing portion and the removable housing portion in response to the engaging of the latch element within the housing.

13. The method of operating a latching mechanism as defined in claim 11, further comprising the step of:
   disengaging the latch element from the housing by rotating the latch element to another orientation, which allows the removable housing to be disassembled from the fixed housing portion.

14. The method of operating a latching mechanism as defined in claim 9, further comprising the step of:
   mechanically coupling at least a portion of the housing between the latch element and at least a portion of a secondary latch element,
   wherein the creating of the audio channel step further comprises aligning the audio ports of the housing with a secondary latch element audio ports of the secondary latch element.

15. The method of operating a latching mechanism as defined in claim 14, further comprising the step of:
   mechanically coupling an audio element to the secondary latch element.

16. The method of operating a latching mechanism as defined in claim 15, further comprising the steps of:
   generating an audio output by the audio element; and
   transmitting the audio output through the audio channel.

17. The method of operating a latching mechanism as defined in claim 15, further comprising the steps of:
   receiving an audio input; and
   transferring the audio input to the audio element through the audio channel.

* * * * *